(12) United States Patent
Reinpoldt et al.

(10) Patent No.: US 8,913,129 B2
(45) Date of Patent: Dec. 16, 2014

(54) METHOD AND SYSTEM OF PROGRESSIVE ANALYSIS FOR ASSESSMENT OF OCCLUDED DATA AND REDUNDANT ANALYSIS FOR CONFIDENCE EFFICACY OF NON-OCCLUDED DATA

(75) Inventors: Michael A. Reinpoldt, Windermere, FL (US); Willem H. Reinpoldt, III, Tarpon Springs, FL (US)

(73) Assignee: Thermal Matrix USA, Inc., Tampa, FL (US)

( * ) Notice: Subject to any disclaimer, the term of this patent is extended or adjusted under 35 U.S.C. 154(b) by 580 days.

(21) Appl. No.: 13/014,856

(22) Filed: Jan. 27, 2011

(65) Prior Publication Data

US 2012/0194674 A1   Aug. 2, 2012

(51) Int. Cl.
  *H04N 7/18*   (2006.01)
  *G06K 9/00*   (2006.01)
(52) U.S. Cl.
  CPC .............. *H04N 7/18* (2013.01); *G06K 9/00771* (2013.01)
  USPC ........................................................ 348/143
(58) Field of Classification Search
  USPC ............................. 348/48, 115, 148, 159, 340
  See application file for complete search history.

(56) References Cited

U.S. PATENT DOCUMENTS 7,209,576 B2 *  4/2007  Rankin .......................... 382/107
7,613,325 B2 * 11/2009  Iwasaki et al. ................. 382/103
2002/0130953 A1 *  9/2002  Riconda et al. ................ 348/115
2006/0227214 A1 * 10/2006  Fleury et al. ................... 348/148
2010/0201787 A1 *  8/2010  Zehavi ............................ 348/48

OTHER PUBLICATIONS

Detection and Segmentation of Multiple, Partially Occluded Objects by Grouping, Merging, Assigning Part Detection Responses BoWu o Ram Nevatia Int J Comput Vis (2009) 82: 185-204.*
Detection and Segmentation of Multiple, Partially Occluded Objects by Grouping, Merging, Assigning Part Detection Responses BoWu • Ram Nevatia Int J Comput Vis (2009) 82: 185-204.*

* cited by examiner

*Primary Examiner* — Tung Vo
*Assistant Examiner* — Joseph Becker
(74) *Attorney, Agent, or Firm* — Allen, Dyer, Doppelt, Milbrath & Gilchrist

(57) ABSTRACT

A method of progressive analysis for assessment of occluded data is disclosed. In a particular embodiment, the method includes capturing sensor data from at least one sensor, identifying a target of interest using the sensor data, and determining a location and orientation of the target of interest using a last computed direction of travel of the target. The method also includes segmenting the sensor data of the target of interest into segments for analysis and determining whether a particular segment of the segments is occluded. In addition, the method includes determining whether additional sensor data from the at least one sensor confirms that the particular occluded segment is no longer occluded allowing unresolved analysis to be supplemented with progressive analysis to provide incremental resolution to the analysis.

18 Claims, 6 Drawing Sheets

| Sensor | Point of Interest (Target ID) | Scans for Target | SubRegion on Target | Good/Bad/Occluded | Confidence |
|---|---|---|---|---|---|
| 1 | 100 | 1 | 1 | Good | 100% |
| 2 | 100 | 2 | 1 | Good | 100% |
| 1 | 100 | 3 | 1 | Bad | 67% |
| 1 | 100 | 4 | 1 | Occluded | 67% |
| 1 | 101 | 1 | 1 | Good | 100% |
| 1 | 101 | 2 | 2 | Good | 100% |
| 1 | 101 | 3 | 3 | Bad | 100% |
| 2 | 101 | 4 | 4 | Good | 100% |
| 1 | 102 | 1 | 1 | Occluded | 0% |
| 1 | 102 | 2 | 1 | Good | 100% |

METHOD AND SYSTEM OF PROGRESSIVE ANALYSIS FOR ASSESSMENT OF OCCLUDED DATA AND REDUNDANT ANALYSIS FOR CONFIDENCE EFFICACY OF NON-OCCLUDED DATA

I. FIELD

The present invention relates in general to the field of concealed object detection and machine vision and in particular to a method for progressive analysis for assessment of occluded data and redundant analysis for confidence efficacy of non-occluded data by assessing multiple images received from one or more sensors to accommodate and discern occluded information.

II. DESCRIPTION OF RELATED ART

Video camera surveillance systems have been deployed for decades, allowing human operators to remotely and visually survey an area displayed on a video monitor by way of one or more video cameras imaging the area. Recently, computer algorithms have begun supplementing and replacing human operators by algorithmically scanning sensor input for prohibited motion, action or features using machine vision techniques.

In addition to grayscale or color video surveillance, sensors employing other extra-video frequencies such as infrared, millimeter wave and terahertz wave are increasingly being used. These sensors have characteristics which allow them to detect objects concealed on a person underneath clothing by blocking or otherwise attenuating the human body's natural energy in the aforementioned frequencies. Similar to their video camera counterparts, systems and products imaging infrared, millimeter wave and terahertz frequencies have employed computer analysis for algorithmic detection of concealed objects.

The video and extra-video surveillance systems mentioned exhibit difficulties when the areas, features or people under surveillance are occluded by other areas, features or people, thus preventing complete surveillance or detection of objects in areas occluded from the sensor view.

Additionally, the video and extra-video sensors are typically incapable of scanning the far side of an area, feature or person from imagery of the near side. For example, imaging the front of a person would naturally render the back of a person occluded by the person himself.

In the case of surveillance by human operators, the operator can typically and efficiently integrate the continuous video information from the surveillance scene over time. For example, if a person in the surveillance area is occluded by a tree, a human operator typically waits for the person to emerge from behind the tree and then surveys that person. This is a natural, expected process for a human operator.

In the case of algorithmic surveillance by computer, the computer requires a similar capability of recognizing when an area, feature or person under surveillance is partially or completely occluded and defer analysis until such time that the area or person is no longer occluded. Additionally, the computer surveillance implementation may leverage multiple sensors surveying the same scene from different views or surveying adjacent scenes to detect when an area, feature or person is and is no longer occluded.

However, no adequate method and system has been provided for employing the functionality of combining the information of multiple frames (scans) of sensor data, or multiple sensors in order to 1) detect occluded data, 2) resolve analysis of occluded data, and 3) employ redundant analysis of non-occluded data to increase analysis results confidence. Furthermore, no adequate method has been provided for tracking moving features or people throughout a scene or across multiple scenes for the purpose of progressively analyzing a target of interest in order to resolve occluded data.

Accordingly, there is a need in the relevant art for a system and method that analyzes sensor imagery, recognizes areas of sensor occlusion on a target, and stores affected areas as occluded or indeterminate.

Another need exists in the art for a system and method which performs analysis of subsequent sensor imagery and combines the analysis results with that previously attained so as to progressively complete a full analysis of a target.

Another need exists in the art for a system and method which performs autonomous target tracking, detection of orientation, and target segmentation so that progressive analysis results may be correctly combined with previous results to form a complete algorithmic representation of the target. In this fashion, new analysis results of previously occluded areas are combined to the summation results in an additive fashion.

Another need exists in the art for a system and method to optionally track targets across multiple sensors viewing the same scene or adjacent scenes, allowing occluded areas on a tracked target to be resolved using analysis from multiple and perhaps disparate sensors.

Another need exists in the art for a system and method which performs revalidation of non-occluded areas of imagery allowing for a voting algorithm to confirm or disprove the results of previous analysis.

Another need exists in the art for a system and method which presents the data in a visual form for the operator. In one embodiment, the data could be visualized by overlaying green highlights on areas that have been recognized and found to be acceptable, red highlights on areas that have been recognized and found to be unacceptable and yellow highlights on areas that are occluded and indeterminate, and thus require further analysis.

Another need exists in the art for a system and method that shares progressive analysis results amongst multiple sensors that may view the same scene or difference scenes, of the same sensor type or a disparate type or technology, so long as coherent tracking data between sensors exists.

Yet another need exists in the art for a system and method that shares progressive analysis results amongst multiple computing elements, such as video servers, allowing for increased support of computing resources and quantities of sensors.

Yet another need exists in the art for a system and method that automatically alerts the operator's attention should a target be identified with a non-favorable analysis result (concealed object), or with a quantity of occluded/unresolved areas exceeding some adjustable or preset limit.

However, in view of the prior art at the time the present invention was made, it was not obvious to those of ordinary skill in the pertinent art how the identified needs could be fulfilled.

III. SUMMARY

In a particular embodiment, a method and system of progressive analysis for assessment of occluded data is disclosed. The method and system analyzes and processes sensor data to provide: (1) progressive analysis of a possibly occluded area, feature or person, and/or 2) redundant analysis of a non-occluded area, feature or person.

The disclosed system may be used primarily for concealed object detection systems where incomplete analysis of a person is detrimental to the safety and security of the area under surveillance. The disclosed system has additional applications outside of the concealed object detection field.

In a particular embodiment, a method for implementing the progressive analysis of occluded sensor data and redundant analysis of non-occluded sensor data is disclosed. The method includes provision for a single sensor which is periodically or continuously scanned and analyzed for detection of areas, features or people of interest. The method further includes provision for multiple sensors which are singularly, periodically or continuously scanned and analyzed for detection of areas, features or people of interest within the same field of view, overlapping fields of view, contiguous fields of views, independent fields of view, or some combination thereof.

The method further includes the ability for algorithmic procedures to be applied to the sensor data received from one or more sensors to identify features or people that are of interest for progressive analysis.

The method further includes the ability for algorithmic procedures to be applied to the sensor data received from one or more sensors to track identified features or people that are of interest as they move within the field of view of the sensor (s) or amongst different fields of view of the sensors, or as that field of view of the sensor(s) move in relation to the identified features or people of interest, thus aiding continuity of analysis between received sensor data.

The method further includes the ability for algorithmic procedures to be applied to the sensor data received from one or more sensors to determine the orientation of the features or people that are of interest for progressive analysis.

The method further includes the ability for algorithmic procedures to be applied to the sensor data received from one or more sensors in order to segment the features or people that are of interest in order to perform progressive analysis. The segmentation of features or people of interest allow discrete areas of analysis to be defined and utilized during the progressive analysis procedure.

The method further includes the ability to indicate the algorithmically identified progressive analysis results and display the results via computer generated highlights using display techniques including, but not limited to, intensity, 2-D or 3-D spatial location, size, shape, texture, density and contrast.

The method further includes the ability to indicate the presence of algorithmically detected sensor features and display the results via computer generated highlights that are located 360 degrees around an anthropomorphic software avatar including the far side of the avatar, by varying the opacity and/or transparency of the avatar and/or feature highlights.

In another particular embodiment, the method includes the ability to re-evaluate the non-occluded previous results of progressive analysis on an identified feature or person that is not occluded in the present sensor data for the purpose of establishing a confidence factor regarding non-occluded areas of the feature or person.

In yet another particular embodiment, the method includes that ability to implement a voting mechanism that can evaluate some or all of the present and past results of occluded and non-included areas on one or more identified features or persons which will determine intermediate or final analysis results. In one embodiment, this may be implemented using a majority-rules algorithm.

In yet another particular embodiment, the method includes the ability to display the results of the voting mechanism using computer generated highlights that, in one implementation, may change color, intensity, opacity, flash rate or some other visual attribute dependant on the confidence of a particular analysis zone.

One particular advantage provided by the embodiments is that independent scan results are considered holistically instead of individually for improved assessment of the surveillance area.

Another particular advantage provided by the embodiments is that occluded views or data are holistically resolved by evaluating previous and subsequent analysis results in the occluded area, yielding more complete assessment of the surveillance area.

Another particular advantage provided by the embodiments is that non-occluded views or data are holistically re-evaluated by qualifying with previous and subsequent analysis results in the same non-occluded area(s), yielding higher confidence and improved assessment of the surveillance area.

Another particular advantage provided by the embodiments is that multiple views of one or more sensors are holistically and algorithmically combined into a single data set per feature or person of interest, providing simplified operator interface and visual assessment of the analysis results.

Another particular advantage provided by the embodiments is that the integration of individual scan results and/or multiple sensor data into a single data set per feature or person of interest greatly simplifies the tasks of target assessment across sensor boundaries, improving performance and system efficiency.

Another particular advantage provided by the embodiments is that the analysis results can be displayed as computer generated highlights overlaying the sensor imaging data, appearing as highlights that change color, opacity, intensity, permanence, blink-rate and/or other visual attributes to denote non-occluded areas, occluded areas and confidence levels of each analysis result for each feature or person of interest.

Another particular advantage provided by the embodiments is that the results of multiple scans and/or multiple sensors are combined into a single data set for reduced quantity of GUI displays, thereby resulting in greater retention of the operation of the GUI and decreased training time and/or costs for the operators.

Another particular advantage provided by the embodiments is that the combined data set of sensor data results in a GUI requires less display real estate, allowing either a simplified appearance for the GUI or increased use of the GUI display for additional functionality or both.

Another particular advantage provided by the embodiments is the efficiency of operation and simplicity of operation provided by the implementation of this level of sensor fusion.

The method may include isolating features of interest, determining the orientation of each feature, determining non-occluded areas of each feature supportive of analysis, and determining occluded areas not capable of analysis so that those areas can be reconsidered in subsequent or sensor data. In the field of concealed object detection, the features of interest are people within the field of view of the sensor. The method and system may be applied to the display of algorithmic results of video data, such as that imaged during security video surveillance or may be applied to the display of algorithmic results of non-video data, such as that collected by medical sensors in a healthcare environment.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 5:
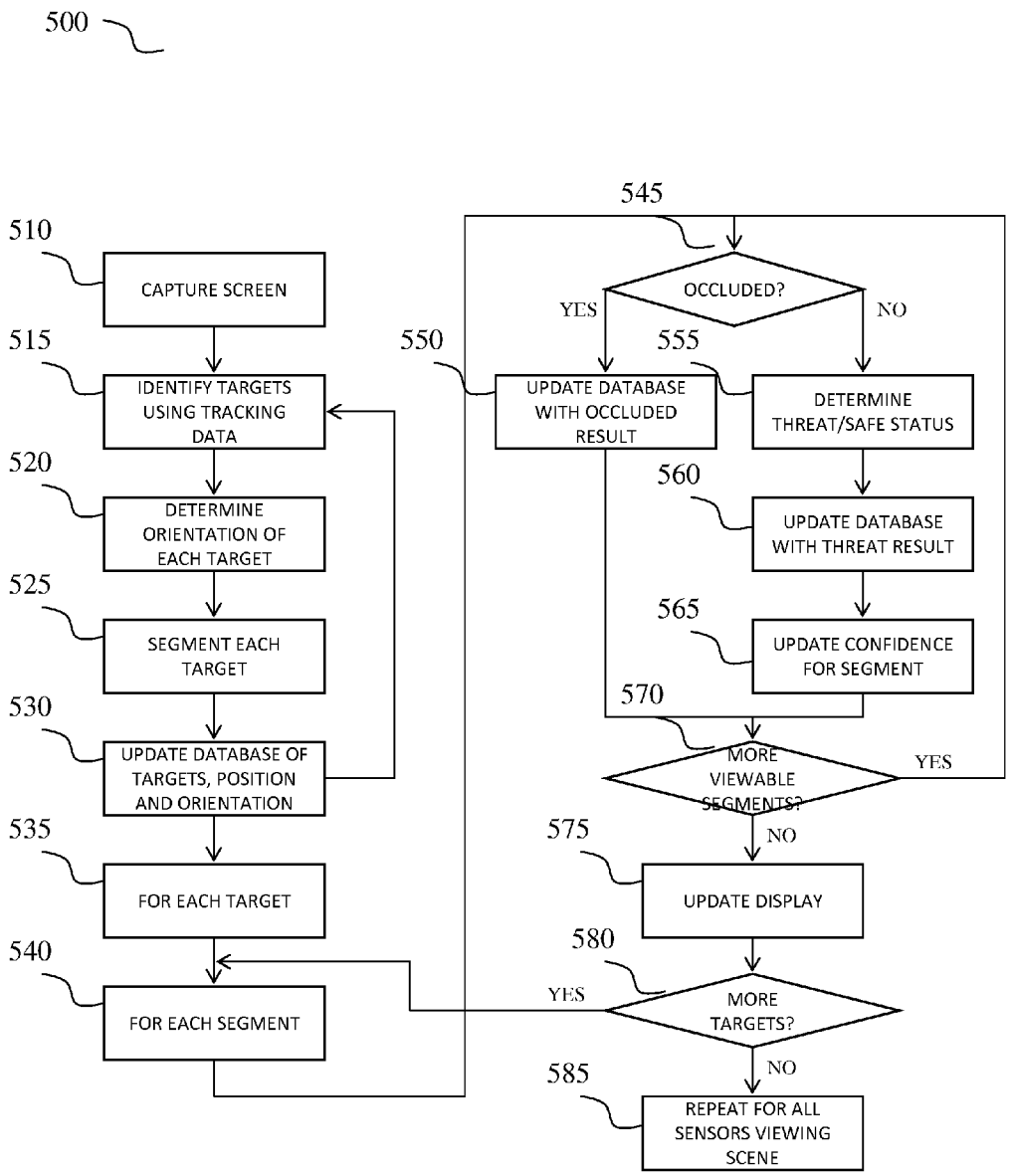
Figure 6:

FIG. 5 is a particular illustrative embodiment of a flow diagram for the analysis process; and FIG. 6 is a spreadsheet diagram of a particular illustrative embodiment of a multiple sensor system depicting examples of scan-related data collected and assessed to 1) resolve occluded areas using progressive analysis and 2) establish confidence rates through redundant evaluation of previously scanned, non-occluded areas.

V. DETAILED DESCRIPTION

As disclosed below, the method and system provides progressive analysis of sensor data by analyzing, combining, storing, and evaluating sensor data from multiple views, multiple scans, multiple sensors, or some combination thereof. The sensor data set can then be evaluated to resolve missing data due to occluded sensor data and/or to increase confidence in non-occluded sensor data through redundant evaluation.

In one embodiment, the invention will receive data from one or more sensors. The sensor(s) may image in the visible, infrared, millimeter wave, terahertz or some other frequency. Multiple sensors may image predominantly the same field of view, allowing broad spectrum imaging of the scene in multiple frequency bands, or image different views of the same area such as front and back views or 360 degree viewing of the same viewing area at some exact or approximate viewing angle increment. Multiple sensors may image overlapping views or non-contiguous views.

For multiple sensor deployments, the spatial relationships and coordinates of each sensor may be mapped into a 2-D or 3-D coordinate memory to simplify tracking of objects or people of interest across sensor boundaries, or to correlate positions amongst overlapping views. One implementation for the mapping process would be using a single, easily distinguishable actor traversing the active scene(s) with learn-mode software recording the actor's position or motion into the 2-D or 3-D coordinate memory throughout a representative sampling of the scene(s) or the entirety of the scene(s).

One implementation for tracking the movement and motion of targets of interest within the fields of view of the sensor(s) is to employ consecutive sensor scans with very small time differences between sensor scans, and comparing the location of detected targets of interest with corresponding locations of previous scans. More sophisticated algorithms could employ averaging filters to accommodate occasional missed motion or extraneous motion. Furthermore, sophisticated algorithms could correlate the target tracking data across multiple sensors in order to increase confidence in the tracking results and to detect deviations.

Determined by the results of the target tracking algorithms, the target orientation can be determined directly from the most recent "track" of the detected motion. Target orientation can then be utilized to determine proper segmentation of the targets of interest so that correct segmentation is achieved.

Target segmentation is required to segment the analysis process into smaller areas which may or may not later be occluded. The use of segmentation allows individual areas or segments of the target of interest to be occluded while still gathering valid analysis results from non-occluded areas or segments. As subsequent scans are made of the target of interest, missing or occluded segments can then be algorithmically combined into the previous analysis results using, in one implementation, an additive process.

The granularity of the target segmentation may be predetermined and fixed or may be adjustable. For deployments where 360° scanning around an individual is required, the angular resolution of the target segmentation must be sufficient to represent the desired area. For example since most sensors cannot image through a person, instead imaging the near side and not the far side, an angular resolution of two segments, representing front and back, would be needed as a minimum. To increase the effectiveness of the progressive analysis methodology, a finer, more granular angular resolution is optimal. For example, one particular implementation may use an angular resolution of 4 segments around the outside of a person of interest, providing front, back, left side and right side segments.

In addition to angular granularity for target segmentation, a linear granularity is also preferred. In the preferred embodiment, the linear granularity would segment the target of interest into vertical or height segments. If the target of interest is a person, the vertical segments may divide the person's height into two or more segments such as head-to-waist and waist-to-feet. As with the angular granularity, this linear granularity increases the effectiveness of the progressive analysis methodology, with a finer, more granular linear resolution being optimal.

Once the target location, orientation and segmentation are computed, each segment of the target of interest can then be algorithmically analyzed for presence of occlusions. In one implementation if the area or segment is algorithmically determined to be occluded, further analysis is deferred on that segment. If the area or segment is algorithmically determined to be not occluded, further analysis can proceed to determine the attributes of that segment. For concealed object detection applications, the aforementioned further analysis may be the algorithmic determination if a concealed object is present in the area.

The results of the determination of occlusion and further analysis for non-occluded areas/segments is then stored in a database for each segment on each target. Through progressive analysis of subsequent scans the database can be completed by re-evaluating previously occluded areas/segments and substituting the non-occluded results.

Additionally, non-occluded areas/segments can be re-evaluated by algorithmically comparing the redundant scan results to the previous results, thus establishing a confidence factor for the redundant areas/segments.

In operation of the above referenced embodiments, a software display may be used to present the combined sensor results of some or all sensors viewing the same scene. In one implementation, the display would present the results as computer generated highlights overlaying the imagery obtained from the sensor(s). Attributes of the highlights such as color, density, brightness, pattern, texture, opacity, or flash rate would be indicative of the analysis results. For example, green highlights may indicate acceptable areas/segments, red highlight may indicate unacceptable areas/segments such as the presence of a concealed object on a person, and yellow highlights may indicate areas/segments that have been thus far occluded and indeterminate.

Additionally, the density, intensity, opacity, flash rate or other visual attribute could be used for each area/segment to denote the algorithmic confidence factor of the data. In one case, a light green highlight would indicate an acceptable area/segment with a low confidence factor due to mixed acceptable/unacceptable results or a low quantity of acceptable results, while a dark green highlight would indicate an acceptable area/segment with a high confidence factor due to redundant acceptable results.

Figure 1:
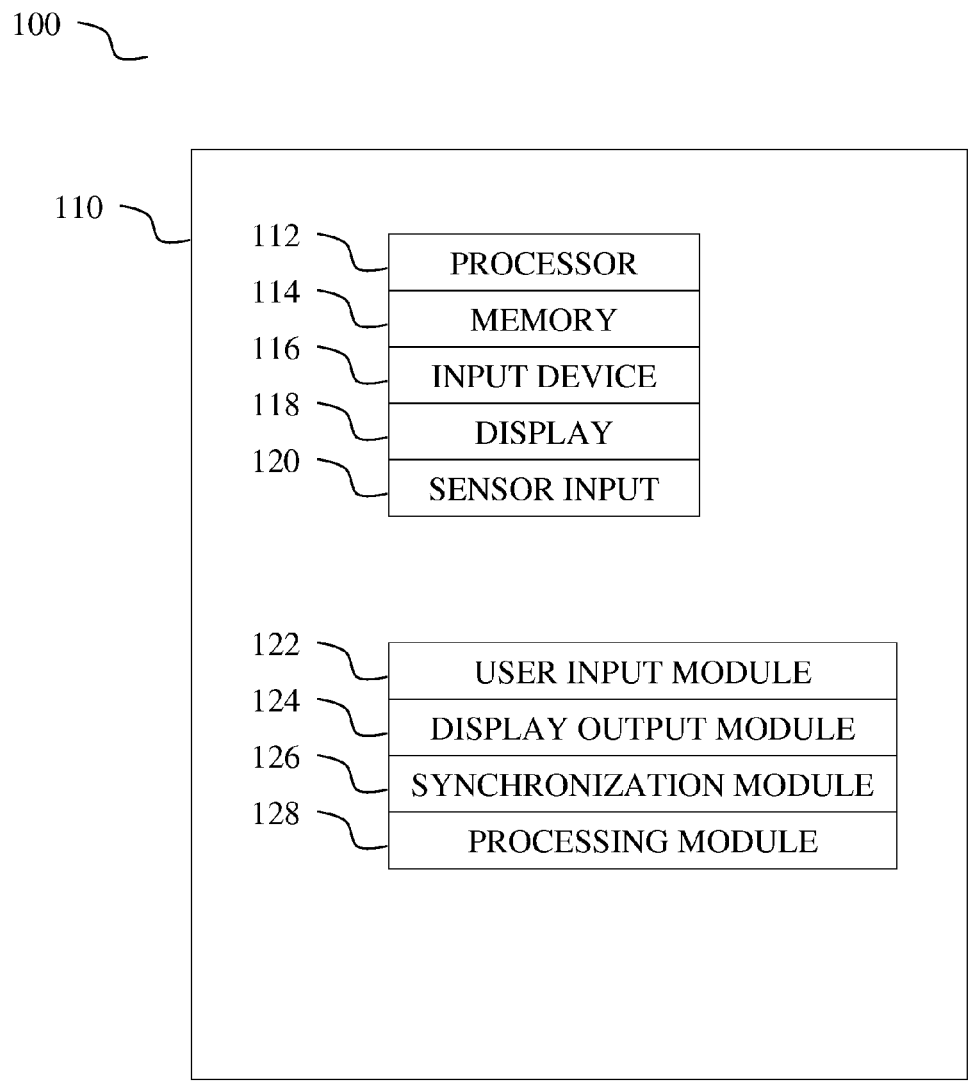
FIG. 1 is a block diagram of a particular embodiment of a method of the computing element for progressive analysis for assessment of occluded data.

A block diagram of a particular embodiment of a system for a progressive analysis for assessment of occluded data is disclosed in FIG. 1 and generally designated 100. The system 100 includes a computing device 110 having at least one processor 112 and a memory 114 that is accessible to the processor 112. The memory 114 includes media that is readable by the processor 112 and that stores data and program instructions of software modules that are executable by the processor 112.

Additionally, the computing device 110 having at least one means of user input 116, either keyboard, mouse, light pen, track ball, track pad, joy stick, graphics tablet, touch screen, or other GUI input device or any combination thereof that is accessible to the processor 112.

Additionally, the computing device 110 having at least one means of user display 118, either a cathode ray tube (CRT) display, liquid crystal display (LCD), light emitting diode (LED) display, plasma display, or other GUI display device that is accessible to the processor 112.

Additionally, the computing device 110 having at least one means of sensor input 120, either frame capture hardware, Ethernet video data transmission, or other sensor input means that is accessible to the processor 112.

Additionally, the processor 112 executes software residing in memory 114 which monitors, processes and reacts to user input from the input device 116 using a user input software module 122, displays operator output and GUI elements to the output device 118 using a display output software module 124, synchronizes the video reception, analysis and display using a synchronization software module 126, and processing the image acquisition, target tracking, target orientation detection, and progress analysis of occluded data using a processing software module 128.

Figure 2:
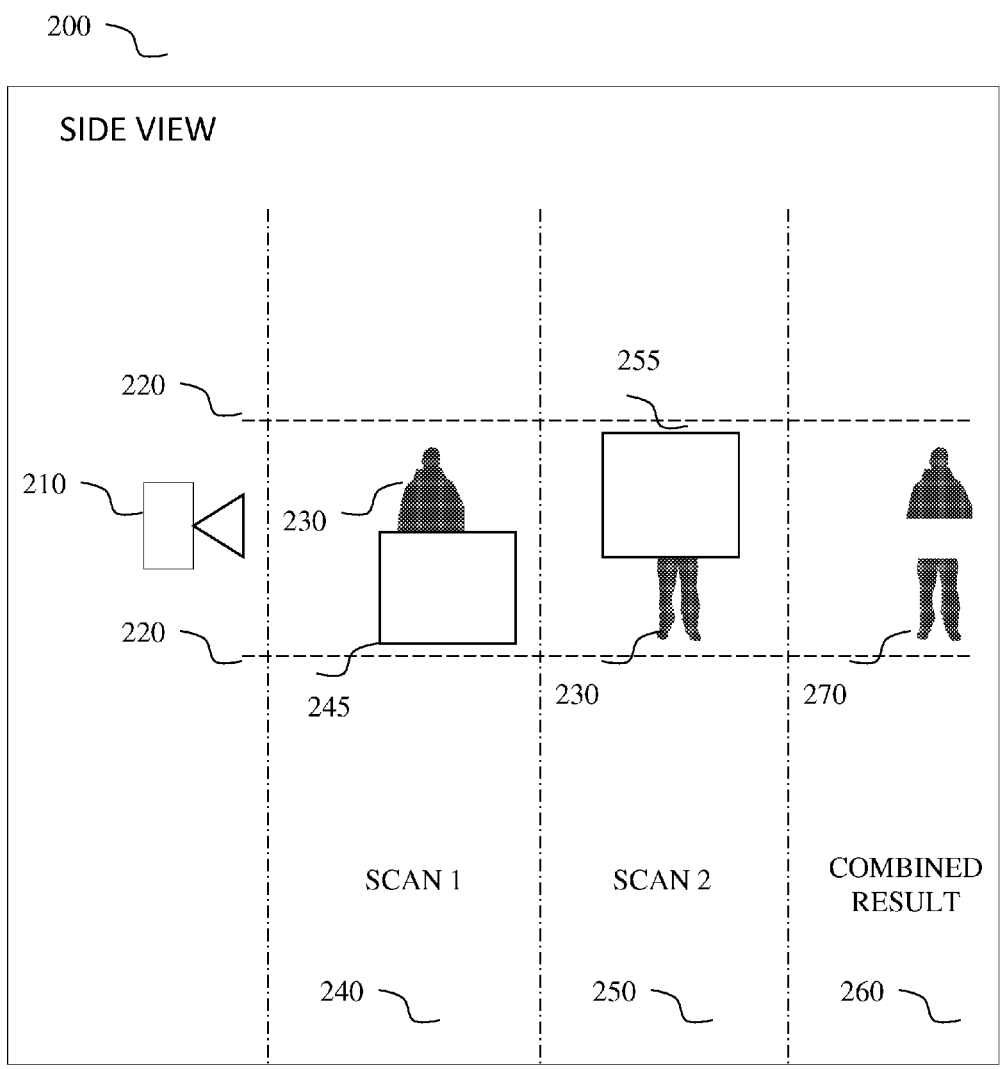
FIG. 2 is a side view diagram of a particular illustrative embodiment of single sensor system imaging a subject at two scans and depicting the resulting progress analysis assessment. The subject depicted is occluded by physical obstructions.

Referring now to FIG. 2, a particular illustrative embodiment of the system is disclosed. The disclosed system is generally designated 200. The disclosed system 200 in the present figure represents a single sensor deployment and is comprised of sensor (210) with field of view 220.

During scan 1, generally designated 240, a subject 230 is positioned behind a lower obstruction 245 so that the lower portion of the subject 230 is occluded.

During scan 2, generally designated 250, the same subject 230 has moved in the field of view 220 of the sensor 210 so that subject 230 is positioned behind an upper obstruction 255 in such a way that the upper portion of subject 230 is occluded.

After progressive analysis of the non-occluded data the combined result, generally designated 260, reveals the additive result of the preceding scan results 240 and 250. In the combined result 270, there remains an occluded area about the midsection of subject 230. Ideally subsequent progressive analysis of the subject 230 would resolve analysis of the subject 230 completely.

Figure 3:
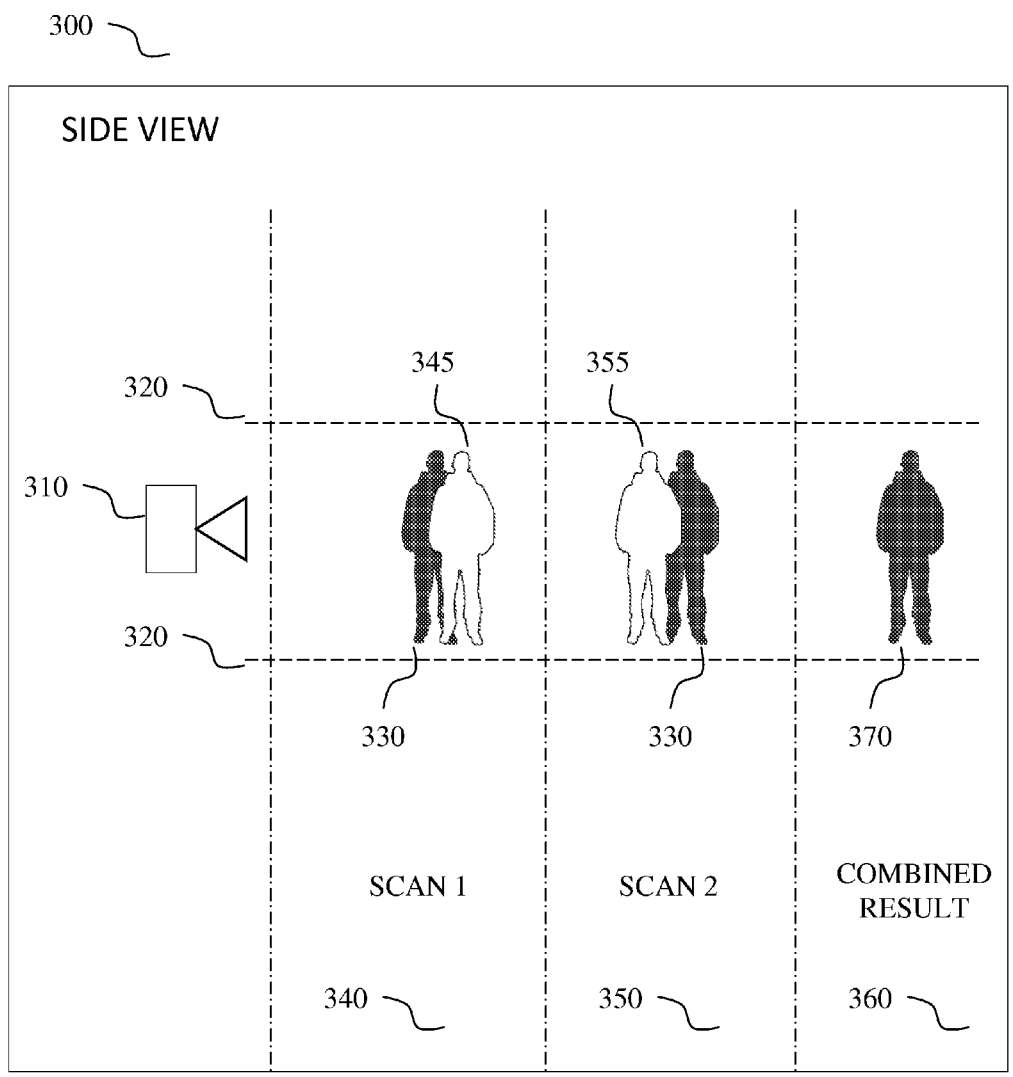
FIG. 3 is a side view diagram of a particular illustrative embodiment of single sensor system imaging a subject at two scans and depicting the resulting progressive analysis assessment. The subject depicted is occluded by people in the foreground.

Referring now to FIG. 3, a particular illustrative embodiment of the system is disclosed. The disclosed system is generally designated 300. The disclosed system 300 in the present figure represents a single sensor deployment and is comprised of sensor 310 with field of view 320.

During scan 1, generally designated 340, a subject 330 is positioned behind another person 345 so that one side of subject 330 is occluded.

During scan 2, generally designated 350, the same subject 330 has moved in the field of view 320 of the sensor 310 and/or another person 355 has moved in the field of view 320 of the sensor 310 so that the opposite side subject 330 is occluded.

After progressive analysis of the non-occluded data the combined result, generally designated 360, reveals the additive result of the preceding scan results 340, 350. In the combined result 370, there remain no occluded areas on the subject 330 visible from the field of view 320 of the sensor 310. In this illustrative embodiment of the system, two scans were sufficient to resolve analysis of the subject 330 completely.

Figure 4:
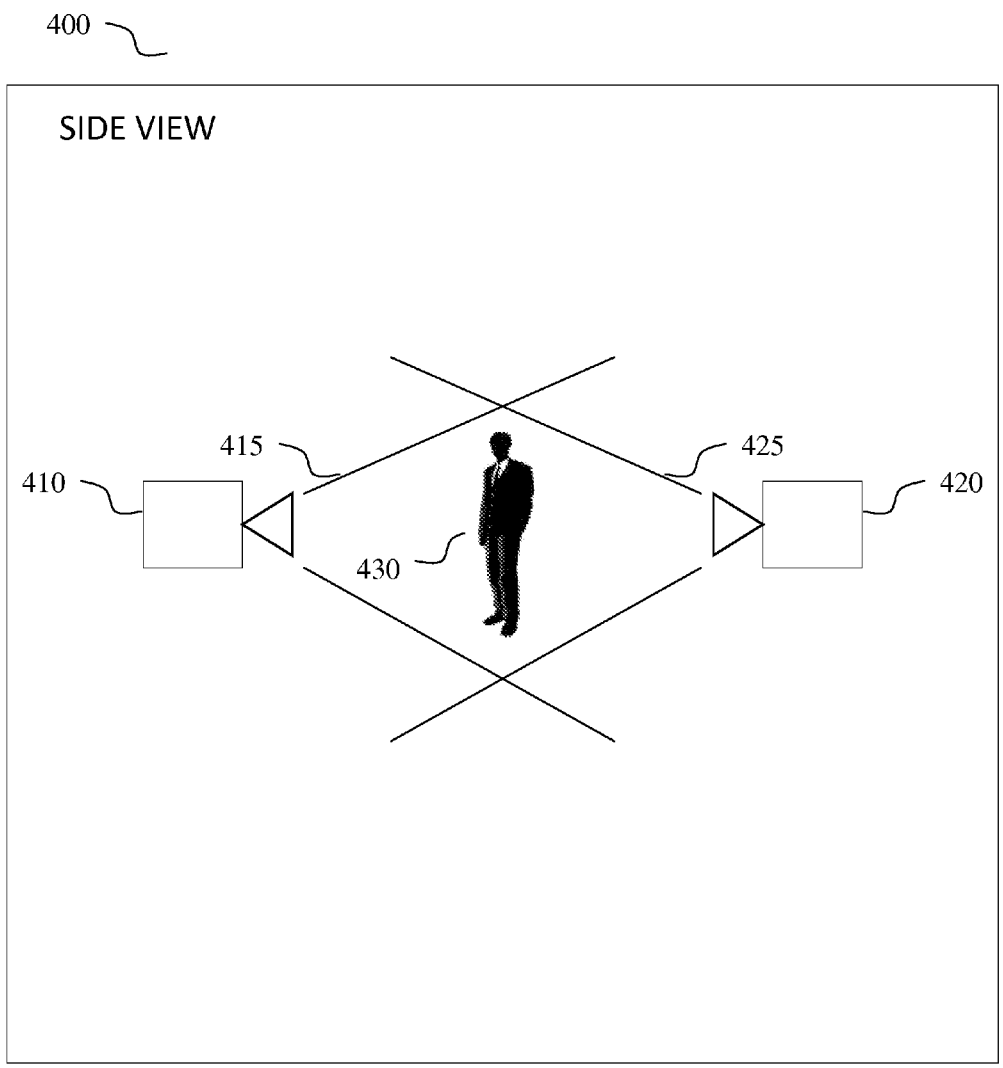
FIG. 4 is a side view diagram of a particular illustrative embodiment of a dual sensor system imaging a subject from two views and depicting the resulting progressive analysis assessment.

Referring now to FIG. 4, a particular illustrative embodiment of the system is disclosed. The disclosed system is generally designated 400. The disclosed system 400 in the present figure represents a dual sensor deployment and is comprised of sensor 410 with a field of view 415 and sensor 420 with a field of view 425.

The dual sensors 410, 420 are in this embodiment positioned opposing each other with their field of views 415, 425 respectively, viewing a subject 430 positioned between the sensors 410, 420. In this fashion, with no physical obstacles occluding the subject 430 from the sensors 410, 420 the subject 430 can be fully analyzed by the sensors 410, 420.

Referring now to FIG. 5, a particular illustrative embodiment of a flow diagram for the analysis process generally designated 500.

At step 510, sensor data is captured from a sensor. For multiple sensor embodiments, the multiple sensor data can be captured simultaneously by parallel computing element or sequentially by the same computing element. Sensor data can take the form of video, binary, numerical data or some other form of data.

At step 515, computer algorithms identify targets of interest within the current sensor data. This process may leverage earlier tracking data 530 to simplify and qualify the results. This process may additionally leverage the algorithmic results of other sensors that have overlapping fields of view of the targets of interest.

In one implementation, the computer algorithms of step 515 would compare the current sensor data from step 510 with learned sensor data without the presence of targets. Video subtraction or some other technique would isolate the presence of new targets by isolating changes of the current sensor data versus the learned sensor data.

In another implementation, the computer algorithms of step 515 would use the imaging properties of visible, infrared, millimeter wave, terahertz or some other wavelength sensor to differentiate between targets of interest and the background sensor data. For example, a sensor data may be void of any terahertz wavelength energy until and unless a target of interest, such as a human body, is present in the sensor data. This new addition to the sensor data could be directly used for target recognition. Additional algorithms could correlate the target tracking data from steps 515 and 530 across multiple sensors in order to increase confidence in the tracking results and to detect deviations.

At step 520, the orientation of each target determined in step 515 is calculated. In one implementation, the target orientation is determined by the last computed direction of travel of the target. Determination of target orientation is important for the subsequent segmentation of each target 525.

At step 525, each target is segmented. In one embodiment, the target is segmented axially about the vertical centerline. In one implementation, the target is segmented into two halves, for instance a front and back half or a left and right half. In another implementation, the target is segmented into four quarters denoting front, back, left and right. In yet another implementation, the target may be segmented into fewer or greater axial segments.

In another embodiment of step 525, the target is segmented linearly into horizontal segments. In one implementation, the target is segmented into two halves, an upper half and lower half. In another implementation, the target is segmented into four horizontal slices, namely top, upper middle, lower middle and bottom. In yet another implementation, the target may be segmented into fewer or greater linear segments.

In yet another embodiment of step 525, the target is segmented both angularly and linearly.

The methodology of target segmentation 525 is so that a partially occluded target can be analyzed for possible occlusions and in segments where occlusions do not exist, analysis can proceed while in segments where occlusions do exist, analysis can be suspended an performed by subsequent scans. As subsequent scans are made of the target of interest, missing or occluded segments can then be algorithmically combined into the previous analysis results using, in one implementation, an additive process.

At step 530, the database of target quantity, location and orientation is updated. If a new target of interest is detected, the database will be appended as required. The database is employed for the following functions: (1) assist with target identification and tracking 515 and target orientation 520 and (2) for each segment of the target, store analysis results including, but not limited to, occluded, non-occluded, previously analyzed count, acceptable/unacceptable results and confidence factor.

Step 535 is the beginning of a loop performed for each target. This step may include initialization of parameters and caching of data used in the loop.

Step 540 is the beginning of a loop performed for each segment of a target. This step may include initialization of parameters and caching of data used in the loop.

Step 545 is the algorithmic determination if a segment on the current target is occluded. This determination may be made using one or more techniques. In one embodiment, an occluded segment may be determined by the intensity, texture, color, pattern, opacity, data complexity, edge count, size, relative motion, heat signature, millimeter wave radiation or terahertz radiation received for that segment by one or more sensors viewing the segment. In another embodiment, the occluded segment may be determined by fixed obstructions present in the sensor's field of view and made aware to the algorithm by means of a learn mode, Computer Aided Design drawing input, manual input, or some other means.

Step 550 is executed if the currently evaluated segment is determined to be occluded from the sensor's view. Here the database is updated with information denoting that the segment was occluded for this scan, and execution of the process continues at step 570.

Step 555 is executed if the currently evaluated segment is determined to be not occluded from the sensor's view. Here additional algorithms are executed to determine if the non-occluded segment is acceptable or unacceptable. For concealed object detection implementations, an acceptable result would indicate that no concealed object is present while an unacceptable result would indicate that a concealed object is present.

Step 560 is executed once an acceptable/unacceptable calculation is complete. Here the database is updated with information denoting that the segment was not occluded for this scan and the results for the acceptable/unacceptable decision are appended.

At step 565, the database is updated with a re-calculated confidence factor for the acceptable/unacceptable decisions. For instance, if the same segment were redundantly scanned three times at three different time periods with three acceptable decisions and no unacceptable decisions, a confidence factor of 100% would be assigned. If the same segment were redundantly scanned three times at three different time periods with two acceptable decisions and one unacceptable decision, a confidence factor of 67% would be as signed.

At step 570, the segment loop began at step 540 repeats so that all segments of the current target are analyzed. If additional segments need to be analyzed, execution transfers to step 545. If all segments have been analyzed, execution transfers to step 575.

At step 575, the operator's Graphical User Interface (GUI) is optionally updated to display the current results of the analysis. In another implementation, this step can be relegated to another location in the process. For example, the display may not update until all targets and sensors have been analyzed. As another example, the display update may occur at a preset time interval which may be asynchronous to the analysis process.

At step 580, the target loop began at step 535 repeats so that all targets in the current sensor data/image are analyzed. If additional targets need to be analyzed, execution transfers to step 540. If all targets have been analyzed, execution transfers to step 585.

At step 585, process 500 is repeated for all sensors viewing the scene.

Referring now to FIG. 6, a particular illustrative embodiment of a database generally designated 600. The disclosed database 600 is comprised of information relating to the analysis of each segment of each target of each scan of each sensor, including but not limited to, sensor ID, target ID (point of interest), scan count for target, segment (subregion on target), analysis results (acceptable/unacceptable/occluded) and confidence factor.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of progressive analysis for assessment of occluded data, the method comprising:
   capturing sensor data from at least one sensor;
   identifying a target of interest using the sensor data;
   determining a location and orientation of the target of interest using a last computed direction of travel of the target;
   segmenting the sensor data of the target of interest into segments for analysis;
   updating a database with data of the target of interest's location and orientation;
   initializing data parameters and caching the data for the target of interest;
   initializing segment parameters and caching the segments of the target of interest;
   identifying a particular non-occluded segment of the target of interest;
   updating the database with the data of the particular non-occluded segment;
   analyzing the particular non-occluded segment to establish a confidence level of the particular non-occluded segment;
   determining whether a particular segment of the segments is occluded;
   identifying the particular occluded segment;
   updating the database with the data of the particular occluded segment;
   capturing additional sensor data from a second sensor using frequencies of visible, infrared, millimeter or terahertz, that are different frequencies from the sensor data of the at least one sensor when the particular occluded segment is identified;
   determining whether the additional sensor data confirms that the particular occluded segment remains occluded to establish a confidence level; and
   displaying the particular occluded segment that remains occluded to a user when the additional sensor data is unable to resolve the particular occluded segment.

2. The method of claim 1, wherein the sensor data is video, binary, numerical data, or any combination thereof.

3. The method of claim 2, wherein the sensor data is captured simultaneously by parallel computing element or sequentially by the same computing element.

4. The method of claim 3, further comprising isolating changes of the sensor data to identify a new target of interest.

5. The method of claim 4, wherein segmenting the sensor data is axially about a vertical centerline of the target of interest.

6. The method of claim 4, wherein segmenting the sensor data is linearly about a horizontal axis of the target of interest.

7. The method of claim 4, wherein segmenting the sensor data is angularly and linearly.

8. The method of claim 4, wherein the particular occluded segment is determined by intensity, texture, color, pattern, opacity, data complexity, edge count, size, relative motion, heat signature, millimeter wave radiation or terahertz radiation, or any combination thereof.

9. A system of progressive analysis for assessment of occluded data, the system comprising:
   at least one sensor input to capture sensor data of a scene;
   a user input module to identify a target of interest using the sensor data;
   a synchronization module to determine a location and orientation of the target of interest using a last computed direction of travel of the target;
   a processing module to segment the sensor data of the target of interest into segments for analysis, update a database with data of the target of interest's location and orientation, initialize data parameters and cache the data for the target of interest; initialize segment parameters and cache the segments of the target of interest, identify a particular non-occluded segment of the target of interest, update the database with the data of the particular non-occluded segment, analyze the particular non-occluded segment to establish a confidence level of the particular non-occluded segment, identify a particular occluded segment of the sensor data, update the database with the data of the particular occluded segment;
   additional sensor data captured from a second sensor input using frequencies of visible, infrared, millimeter or terahertz, that are different frequencies from the sensor data of the at least one sensor input when the particular occluded segment is identified to determine whether the additional sensor data confirms that the particular occluded segment remains occluded to establish a confidence level; and
   a display for displaying the particular occluded segment to a user.

10. The system of claim 9, wherein the sensor data includes frequencies of visible, infrared, millimeter, terahertz, or any combination thereof.

11. The system of claim 10, wherein the sensor data is captured simultaneously by parallel computing element or sequentially by the same computing element.

12. The system of claim 11, further comprising isolating changes of the sensor data to identify a new target of interest.

13. The system of claim 12, further comprising differentiating between the target of interest and background sensor data.

14. The system of claim 13, wherein segmenting the sensor data is axially about a vertical centerline of the target of interest.

15. The system of claim 13, wherein segmenting the sensor data is linearly about a horizontal axis of the target of interest.

16. The system of claim 13, wherein segmenting the sensor data is angularly and linearly.

17. The system of claim 16, wherein the particular occluded segment is determined by intensity, texture, color, pattern, opacity, data complexity, edge count, size, relative motion, heat signature, millimeter wave radiation or terahertz radiation, or any combination thereof.

18. A non-transitory processor readable medium having processor instructions that are executable to cause a processor to:
 capture sensor data from at least one sensor;
 identify a target of interest using the sensor data;
 determine a location and orientation of the target of interest using a last computed direction of travel of the target;
 segment the sensor data of the target of interest into segments for analysis;
 update a database with data of the target of interest's location and orientation;
 initialize data parameters and caching the data for the target of interest;
 initialize segment parameters and caching the segments of the target of interest;
 identify a particular non-occluded segment of the target of interest;
 update the database with the data of the particular non-occluded segment;
 analyze the particular non-occluded segment to establish a confidence level of the particular non-occluded segment;
 determine whether a particular segment of the segments is occluded;
 identify the particular occluded segment;
 update the database with the data of the particular occluded segment;
 capture additional sensor data from a second sensor using frequencies of visible, infrared, millimeter or terahertz, that are different frequencies from the sensor data of the at least one sensor when the particular occluded segment is identified;
 determine whether the additional sensor data from the at least one sensor confirms that the particular occluded segment remains occluded; and
 display the particular occluded segment that remains occluded to a user.

* * * * *